US012592919B2

(12) United States Patent
     Baskaran et al.

(10) Patent No.:     US 12,592,919 B2
(45) Date of Patent:        Mar. 31, 2026

(54) RE-AUTHENTICATION KEY GENERATION

(71) Applicant: Lenovo (Singapore) PTE. LTD., New Tech Park (SG)

(72) Inventors: Sheeba Backia Mary Baskaran, Friedrichsdorf (DE); Andreas Kunz, Ladenburg (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 145 days.

(21) Appl. No.: 17/904,691

(22) PCT Filed: Feb. 22, 2021

(86) PCT No.: PCT/IB2021/051480
     § 371 (c)(1),
     (2) Date: Aug. 19, 2022

(87) PCT Pub. No.: WO2021/165934
     PCT Pub. Date: Aug. 26, 2021

(65)          Prior Publication Data
     US 2023/0105597 A1     Apr. 6, 2023

Related U.S. Application Data

(60) Provisional application No. 62/979,334, filed on Feb. 20, 2020.

(51) Int. Cl.
     *H04L 9/40*          (2022.01)
(52) U.S. Cl.
     CPC ................................. *H04L 63/083* (2013.01)

(58) Field of Classification Search
     CPC ... H04L 63/08; H04L 63/0428; H04L 63/068; H04L 63/062; H04L 63/06;
     (Continued)

(56)          References Cited

U.S. PATENT DOCUMENTS

2010/0008507 A1*   1/2010   Galante ............... H04W 12/041
                                                            380/278
2014/0164763 A1    6/2014   Cherian et al.
                        (Continued)

FOREIGN PATENT DOCUMENTS

WO          2019140337 A1     7/2019

OTHER PUBLICATIONS

EAP Extensions for EAP Re-authentication Protocol (ERP), Narayanan et al. Qualcomm, Aug. 2008 (Year: 2008).*
                        (Continued)

*Primary Examiner* — Chris Parry
*Assistant Examiner* — Abderrahmen Chouat
(74) *Attorney, Agent, or Firm* — Kunzler Needham & Hilton

(57)          ABSTRACT

Apparatuses, methods, and systems are disclosed for re-authentication key generation. One method (1100) includes transmitting (1102) a re-authentication key with a key set identifier in an extensible authentication protocol message. The re-authentication key is generated using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; or some combination thereof.

20 Claims, 12 Drawing Sheets

(58) Field of Classification Search
CPC ... H04L 2209/80; H04L 63/083; H04L 63/10;
H04W 12/06; H04W 12/0431; H04W
12/041; H04W 12/0433
See application file for complete search history.

(56) References Cited

U.S. PATENT DOCUMENTS

| | | | |
|---|---|---|---|
| 2016/0134610 A1 | 5/2016 | Lee et al. | |
| 2020/0029212 A1 | 1/2020 | Lee et al. | |
| 2020/0059783 A1* | 2/2020 | Wifvesson | ............ H04W 12/06 |
| 2021/0051468 A1* | 2/2021 | Baskaran | .............. H04W 48/16 |

OTHER PUBLICATIONS

Z. Cao et al., "EAP Extensions for the EAP Re-authentication Protocol (ERP)", Internet Engineering Task Force (IETF), Jul. 26, 2012, pp. 1-47.

Motorola Mobility Lenovo Broadcom, Conclusions about Trusted Non-3GPP Access, SA WG2 Meeting #129bis S2-1812598, Nov. 26-30, 2018, p. 1-18.
3GPP, "3rd Generation Partnership Project; Technical Specification Group Services and System Aspects; System architecture for the 5G System (5GS); Stage 2 (Release 16)", 3GPP TS 23.501 V16.3.0, Dec. 2019, p. 1-417.
3GPP, "3rd Generation Partnership Project; Technical Specification Group Services and System Aspects; Procedures for the 5G System (5GS); Stage 2 (Release 16)", 3GPP TS 23.502 V16.3.0, Dec. 2019, p. 1-558.
3GPP, "3rd Generation Partnership Project; Technical Specification Group Services and System Aspects; Security architecture and procedures for 5G system (Release 16)", 3GPP TS 33.501 V16.1.0, Dec. 2019, p. 1-202.
PCT/IB2021/051480, "Notification of Transmittal of the International Search Report and the Written Opinion of the International Searching Authority, or the Declaration", International Searching Authority, PCT, May 6, 2021, pp. 1-14.

* cited by examiner

200

300

500

1100

1200

RE-AUTHENTICATION KEY GENERATION

CROSS-REFERENCE TO RELATED APPLICATIONS

This application claims priority to U.S. Patent Application Ser. No. 62/979,334 entitled "APPARATUSES, METHODS, AND SYSTEMS FOR SECURITY CONTEXT PROVISION FOR TNAP MOBILITY IN 5G/NEXT GENERATION NETWORKS" and filed on Feb. 20, 2020 for Sheeba Backia Mary Baskaran, which is incorporated herein by reference in its entirety.

FIELD

The subject matter disclosed herein relates generally to wireless communications and more particularly relates to re-authentication key generation.

BACKGROUND

In certain wireless communications networks, encryption keys may be used. A system may provide and/or generate the encryption keys. For example, a 5G system may be used to provide and/or generate encryption keys, but the process used by the 5G system may be undetermined.

BRIEF SUMMARY

Methods for re-authentication key generation are disclosed. Apparatuses and systems also perform the functions of the methods. One embodiment of a method includes transmitting a re-authentication key with a key set identifier in an extensible authentication protocol message. The re-authentication key is generated using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; or some combination thereof.

One apparatus for re-authentication key generation includes a transmitter that transmits a re-authentication key with a key set identifier in an extensible authentication protocol message. The re-authentication key is generated using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; or some combination thereof.

Another embodiment of a method for re-authentication key generation includes generating a re-authentication root key, a serving network re-authentication key, a re-authentication integrity key, an access point key, a re-authentication master session key, or some combination thereof using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; a re-authentication integrity key label; an anti-bidding down between architecture parameter; a trusted access point identifier; trusted access point information; a trusted access point mobility counter; or some combination thereof.

Another apparatus for re-authentication key generation includes a processor that generates a re-authentication root key, a serving network re-authentication key, a re-authentication integrity key, an access point key, a re-authentication master session key, or some combination thereof using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; a re-authentication integrity key label; an anti-bidding down between architecture parameter; a trusted access point identifier; trusted access point information; a trusted access point mobility counter; or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
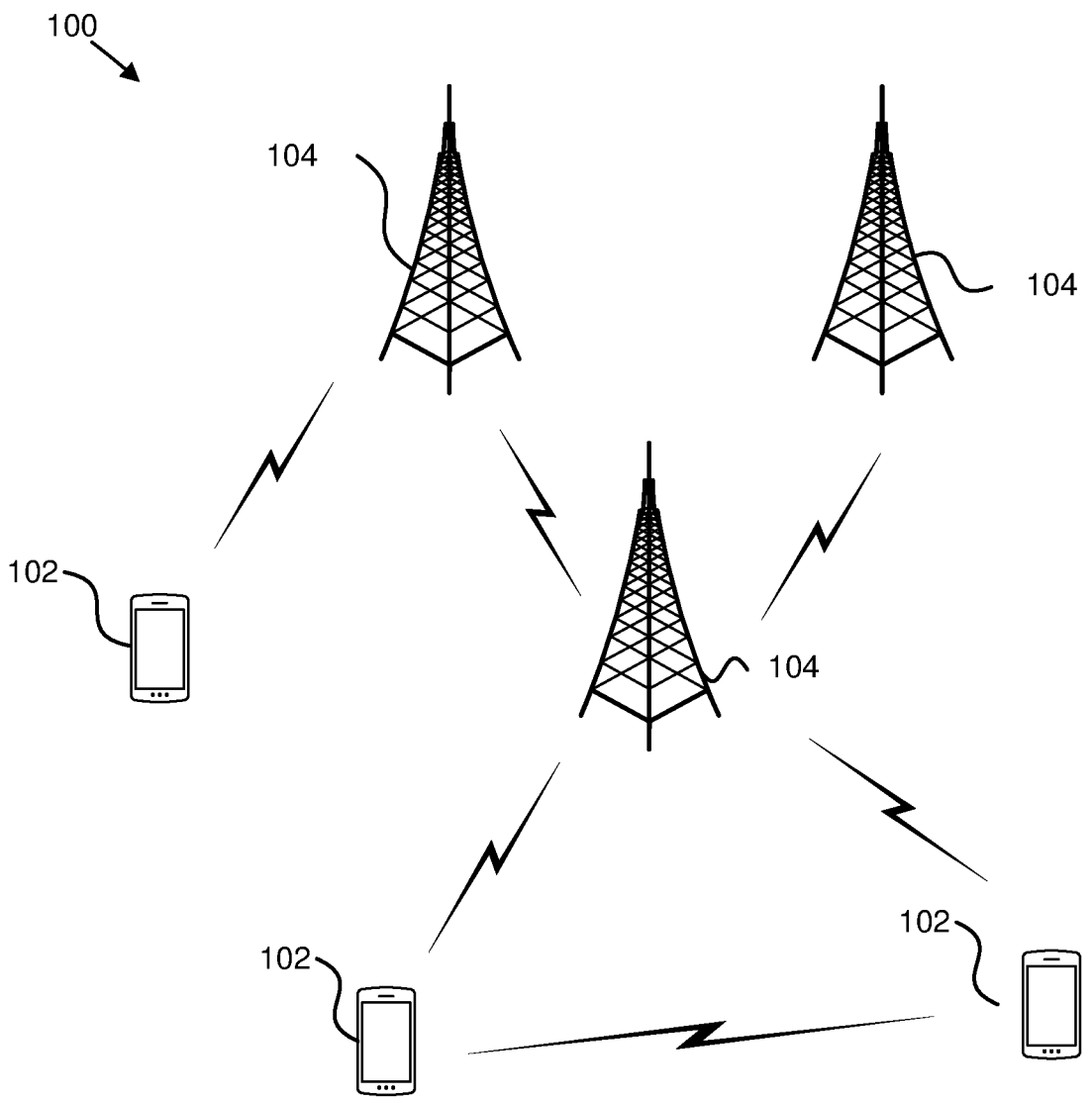
FIG. 1 is a schematic block diagram illustrating one embodiment of a wireless communication system for re-authentication key generation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for re-authentication key generation. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical headmounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via uplink ("UL") communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 and/or a network unit 104 may transmit a re-authentication key with a key set identifier in an extensible authentication protocol message The re-authentication key may be generated using:

a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; or some combination thereof. Accordingly, the remote unit 102 and/or the network unit 104 may be used for re-authentication key generation.

In certain embodiments, a remote unit 102 and/or a network unit 104 may generate a re-authentication root key, a serving network re-authentication key, a re-authentication integrity key, an access point key, a re-authentication master session key, or some combination thereof using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; a re-authentication integrity key label; an anti-bidding down between architecture parameter; a trusted access point identifier; trusted access point information; a trusted access point mobility counter; or some combination thereof. Accordingly, the remote unit 102 and/or the network unit 104 may be used for re-authentication key generation.

Figure 2:
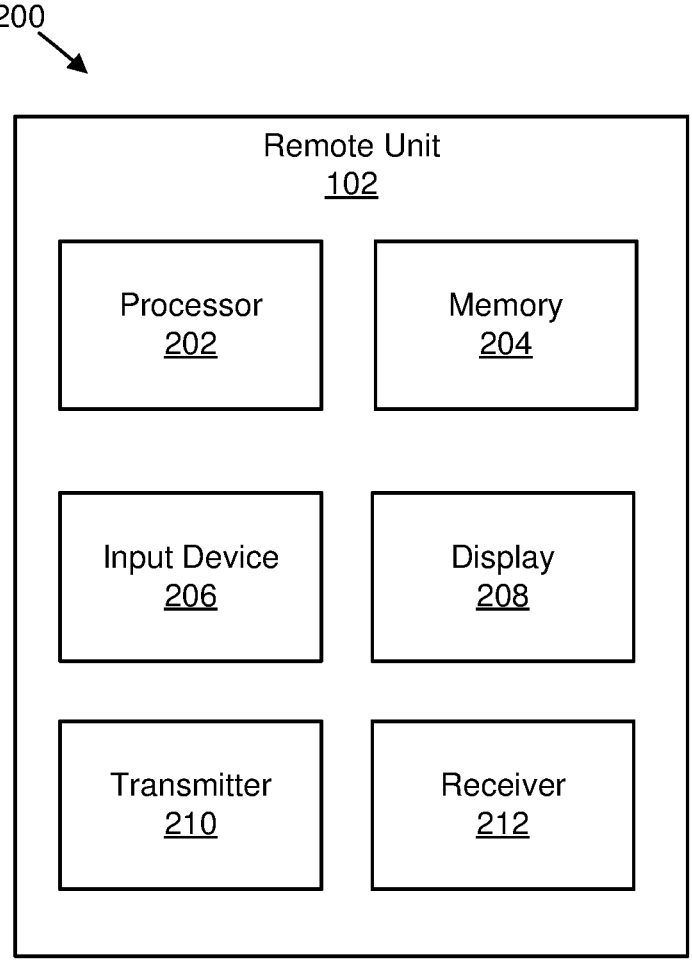
FIG. 2 is a schematic block diagram illustrating one embodiment of an apparatus that may be used for re-authentication key generation.

FIG. 2 depicts one embodiment of an apparatus 200 that may be used for re-authentication key generation. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 may transmit a re-authentication key with a key set identifier in an extensible authentication protocol message. The re-authentication key may be generated using: a public land mobile network identifier; a serving network name identifier; a trusted network domain name identifier; a trusted gateway function identifier; a subscription permanent identifier; a network access identifier; a user equipment identifier; a reauthentication code; a separator; and/or a length of a parameter.

In some embodiments, the processor 202 may generate a re-authentication root key, a serving network re-authentication key, a re-authentication integrity key, an access point key and/or a re-authentication master session key using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; a re-authentication integrity key label; an anti-bidding down between architecture parameter; a trusted access point identifier; trusted access point information; and/or a trusted access point mobility counter.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
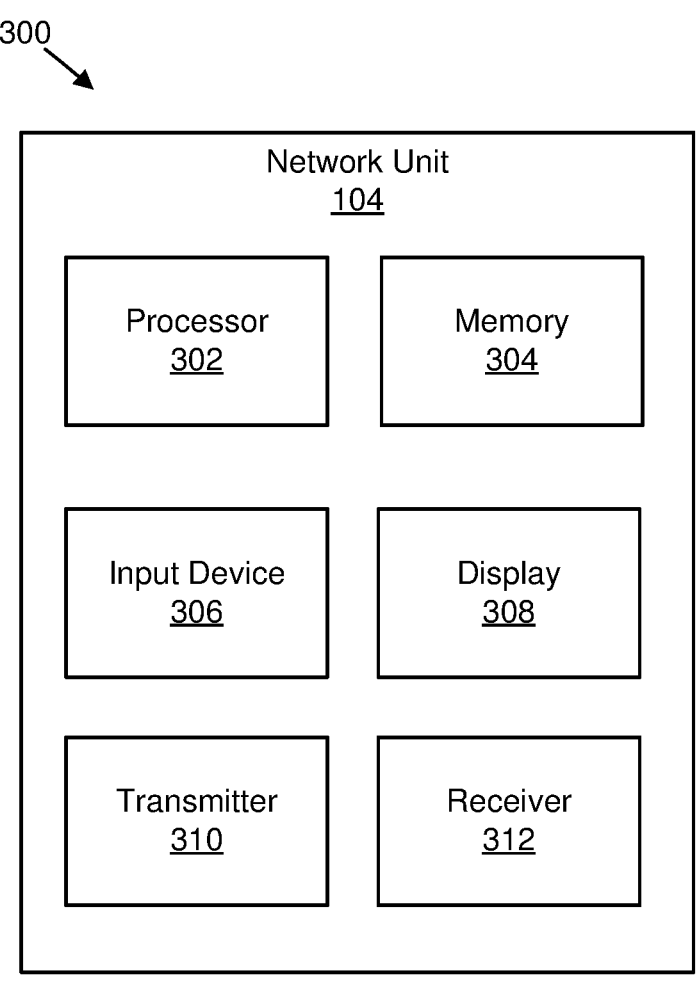
FIG. 3 is a schematic block diagram illustrating one embodiment of an apparatus that may be used for re-authentication key generation.

FIG. 3 depicts one embodiment of an apparatus 300 that may be used for re-authentication key generation. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may transmit a re-authentication key with a key set identifier in an extensible authentication protocol message. The re-authentication key may be generated using: a public land mobile network identifier; a serving network name identifier; a trusted network domain name identifier; a trusted gateway function identifier; a subscription permanent identifier; a network access identifier; a user equipment identifier; a reauthentication code; a separator; and/or a length of a parameter.

In some embodiments, the processor 302 may generate a re-authentication root key, a serving network re-authentication key, a re-authentication integrity key, an access point key and/or a re-authentication master session key using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; a re-authentication integrity key label; an anti-bidding down between architecture parameter; a trusted access point identifier; trusted access point information; and/or a trusted access point mobility counter.

In certain embodiments, if a 5G registered user equipment ("UE") moves between different access points (e.g., trusted network access point ("TNAP"), TNAP mobility) after its primary authentication with a 5G Network, a UE may be expected to perform re-authentication using an extensible authentication protocol ("EAP") re-authentication protocol ("ERP") with a trusted network gateway function ("TNGF"), if the ERP is supported by the UE and the network functions and/or entities (e.g., TNAP, TNGF, AMF and authentication server function ("AUSF")). During re-authentication, a TNGF may need to provide a target TNAP with the security context derived from a root re-authentication key ("rRK") (e.g., a key derived from security context established during primary authentication) to setup access security.

As may be appreciated, more than one TNAP key (e.g., $K_{TNAP}$ or rMSK (when rMSK, derived from rRK either directly or indirectly, may be used as new $K_{TNAP}$)) for different TNAPs may be derived from the same root re-authentication key ("rRK") to support TNAP mobility for a UE among several TNAPs, thus a key may be used with other TNAPs.

In various embodiments, a 5G core network ("5GC") supports both untrusted non-3GPP access networks and trusted non-3GPP access networks ("TNANs").

Figure 4:
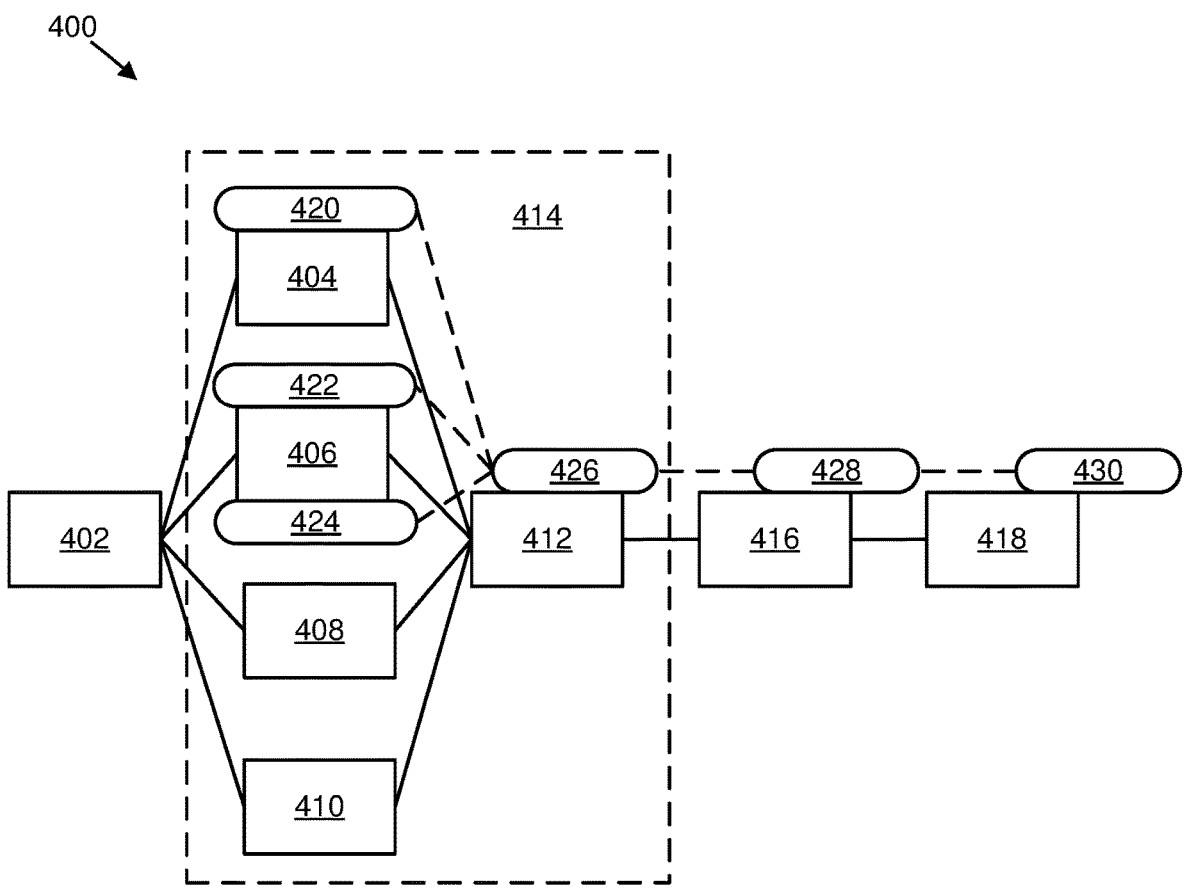
FIG. 4 is a schematic block diagram illustrating one embodiment of a trusted network system.

In some embodiments, a trusted non-3GPP access point ("TNAP") (e.g., trusted wireless LAN ("WLAN") access point) may be connected to a 5GC via a trusted non-3GPP gateway function ("TNGF"). The TNAP and the TNGF together form a trusted non-3GPP access network (TNAN)

as shown in FIG. 4. FIG. 4 is a schematic block diagram illustrating one embodiment of a trusted network system 400. The system 400 includes a UE 402, a TNAP1 404, a TNAP2 406, a TNAP3 408, a TNAPN 410, and a TNGF 412. A TNAN 414 includes the TNAP1 404, the TNAP2 406, the TNAP3 408, and the TNAPN 410. The system 400 also includes an AMF 416 and an AUSF 418. The TNAP1 404 may have an rMSK1 420 used as a $K_{TNAP}$. Moreover, the TNAP2 406 may have an rMSK1 422 used as a $K_{TNAP}$ and an rMSK2 424 used as a $K_{TNAP}$. The TNGF 412 may derive rMSKi 426 from rRK. However, key reuse of $K_{TNAP}$ among access points may lead to a security breach in certain configurations. The AMF 416 may use an rRK 428, and the AUSF 418 may derive an rRK 430 from an EMSK.

The TNAN enables a non-5G-capable over WLAN ("N5CW") devices or a UE to connect to a 5G network through trusted non-3GPP access. The UE connects to a TNAN and it also registers to 5GC over the TNAN by using an EAP-based procedure during a primary authentication. A UE may establish an IPsec tunnel with a TNGF to register with the 5GC over non-3GPP access. The link between the UE and the TNAN may be any data link (e.g., L2) that supports EAP encapsulation (e.g., PPP, PANA, Ethernet, IEEE 802.3, IEEE 802.11, etc.). The interface between the TNAP and TNGF may be an authorization, authentication, and accounting ("AAA") interface. When an EAP procedure is initiated, EAP messages may be encapsulated into layer-2 packets (e.g., into IEEE 802.3/802.1x packets, into IEEE 802.11/802.1x packets, into PPP packets, etc.). Network access identifier ("NAI") provided by a UE indicates that the UE requests "5G connectivity" to a specific public land mobile network ("PLMN") (e.g., NAI="<any_ username> @nai.5gc.mnc<MNC>.mcc<MCC>.3gppnetwork.org"). This NAI may trigger a TNAP to send an AAA request to a TNGF which operates as an AAA proxy. Between the TNAP and TNGF, the EAP packets may be encapsulated into AAA messages. The AAA request may include a TNAP identifier ("TNAP ID") which may be treated as user location information. An EAP-5G procedure may be executed between the UE and the TNGF for the untrusted non-3GPP access if a TNGF key ("$K_{TNGF}$") is created in the UE and in the AMF from the $K_{AMF}$ after successful authentication. The TNGF key may be transferred from the AMF to the TNGF (e.g., within an N2 initial context setup request). The TNGF derives a TNAP key ("$K_{TNAP}$") which is provided to the TNAP to setup access security. The TNAP key may depend on a non-3GPP access technology (e.g., it is a pairwise master key in IEEE 802.11).

In certain embodiments, the TNAP key ("$K_{TNAP}$") may be used to establish layer-2 security between a UE and TNAP. If IEEE 802.11 is used, a 4-way handshake may be executed which establishes a security context between a WLAN AP and a UE that is used to protect unicast and multicast traffic over the air.

In various embodiments, EAP re-authentication (e.g., using EAP re-authentication protocol ("ERP")) may be used for TNAP mobility in trusted access networks and may enable UEs to move from one access point to another without performing a full primary authentication. In such embodiments, for every new TNAP, a UE tries to access a new TNAP key ("$K_{TNAP}$") and may be provisioned by the TNGF. In some embodiments, a re-authentication security context may include a re-authentication root key ("rRK"), a re-authentication integrity key ("rIK") and access security key ("rMSK"). For a 5G system, an rMSK may be used as a $K_{TNAP}$ to setup access security. In certain embodiments, a $K_{TNAP}$ may be derived from rRK (e.g., either directly or indirectly) by a TNGF and a UE and may be provided to a TNAP by a TNGF.

Figure 5:
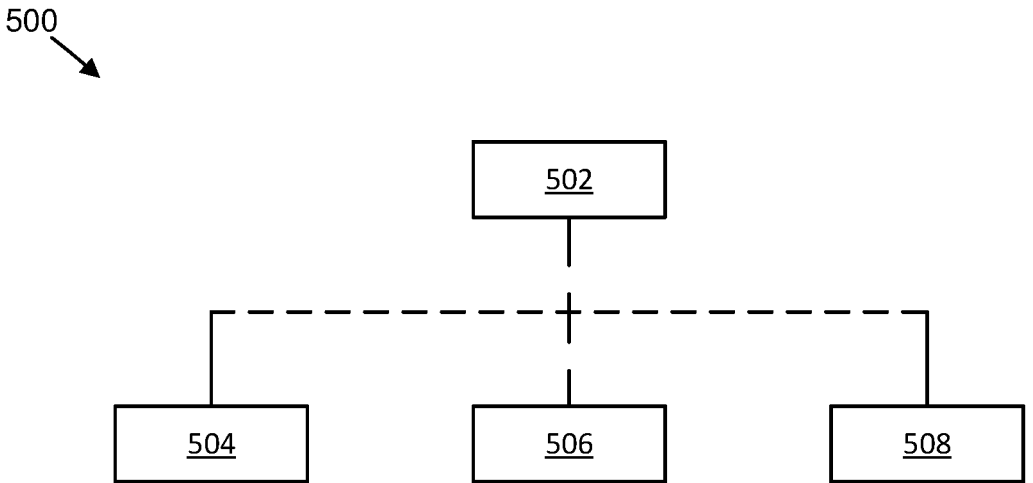
FIG. 5 is a schematic block diagram illustrating one embodiment of a re-authentication key hierarchy.

FIG. 5 illustrates various re-authentication key derivations, specifically, FIG. 5 is a schematic block diagram 500 illustrating one embodiment of a re-authentication key hierarchy. The schematic block diagram 500 includes an rRK 502, and an rIK 504, an rMSK1 506, and an rMSKn 508 derived from the rRK 502.

Each time a peer re-authenticates to a network, the peer and an authenticator may establish an rMSK. The rMSK may serve the same purposes of an MSK, which may be a result of full EAP authentication.

The rRK may be derived from either an EMSK or a DSRK. For the purpose of rRK derivation, derivation of a usage-specific root key ("USRK") or a domain-specific USRK ("DSUSRK") for re-authentication may be used.

The USRK designated for re-authentication may be rRK. A DSUSRK designated for re-authentication may be a DS-rRK available to a local ER server in a particular domain. For simplicity, keys may be referred to without a DS label herein. However, the scope of the various keys may not be limited to respective domains for which they are derived, in the case of domain-specific keys. Based on the ER server with which a peer performs an ERP exchange, it may know that corresponding keys may be used. rRK may be used to derive an rIK and rMSKs for one or more authenticators.

In various embodiments, there may be rRK derivation as follows: rRK=KDF (K, S), where K=EMSK or K=DSRK and S=rRK Label|"\ 0" length. The rRK label may be an IANA-assigned 8-bit ASCII string: EAP Re-authentication Root Key@ietf.org assigned from the "USRK Key Labels" name space. The key derivation function ("KDF") and algorithm agility for the KDF may be defined. An rRK derived from a DSRK may be referred to as a DS-rRK.

In certain embodiments, there may be rIK derivation as follows: rIK=KDF (K, S), where K=rRK and S=rIK Label|"\0" cryptosuite length. The rIK label may be an 8-bit ASCII string: Re-authentication Integrity Key@ietf.org. The length field may refer to a length of the rIK in octets and may be encoded. The cryptosuite and length of the rIK may be part of the input to the KDF to ensure cryptographic separation of keys if different rIKs of different lengths (e.g., for use with different message authentication code ("MAC") algorithms) may be derived from the same rRK. The cryptosuite may be encoded as an 8-bit number. The rIK may be referred to by the EMSKname-NAI within the context of ERP messages. The username part of the EMSKname-NAI may be the EMSKname. The realm may be the domain name of the ER server. If ERP is used with a home ER server, a peer uses the realm from its original NAI. If a local ER server is used, a peer uses a domain name received at a lower layer or through an ERP bootstrapping exchange. An rIK derived from a DS-rRK may be referred to as a DS-rIK.

In some embodiments, the EAP keying framework may indicate that the EMSK must be named using the EAP Session-ID and a binary or textual indication. Following that requirement, the EMSK name may be derived as follows: EMSKname=KDF (EAP Session-ID, "EMSK"|"\0"|length) where: | denotes concatenation "EMSK" consists of the 4 ASCII values for the letters "\0"=is a NULL octet (0x00 in hex) length is the 2-octet unsigned integer 8 in network byte order. In certain embodiments, keys derived from the EMSK may be referred to by the EMSK name and the context of the descendant key usage.

In various embodiments, there may be rMSK derivation in which the rMSK is derived at a peer and server and delivered to an authenticator. The rMSK may be derived following an ERP exchange. The rMSK may be derived as follows: rMSK=KDF (K, S), where K=rRK and S=rMSK Label|"\0"|SEQ|length. The rMSK label may be an 8-bit ASCII string: Re-authentication Master Session Key@ietf.org. The length field may refer to a length of the rMSK in octets and may be encoded. In some embodiments, SEQ is the sequence number sent by the peer in the EAP-Initiate and/or re-authenticate message. This field may be encoded as a 16-bit number in network byte order. In certain embodiments, SEQ may be an unsigned 16-bit sequence number used for replay protection. The SEQ field may be initialized to 0 every time a new rRK is derived. The field may be encoded in network byte order. An rMSK derived from a DS-rRK may be referred to as a DS-rIK herein.

Figure 6:
FIG. 6 is a schematic block diagram illustrating another embodiment of a re-authentication key hierarchy.
Figure 6:
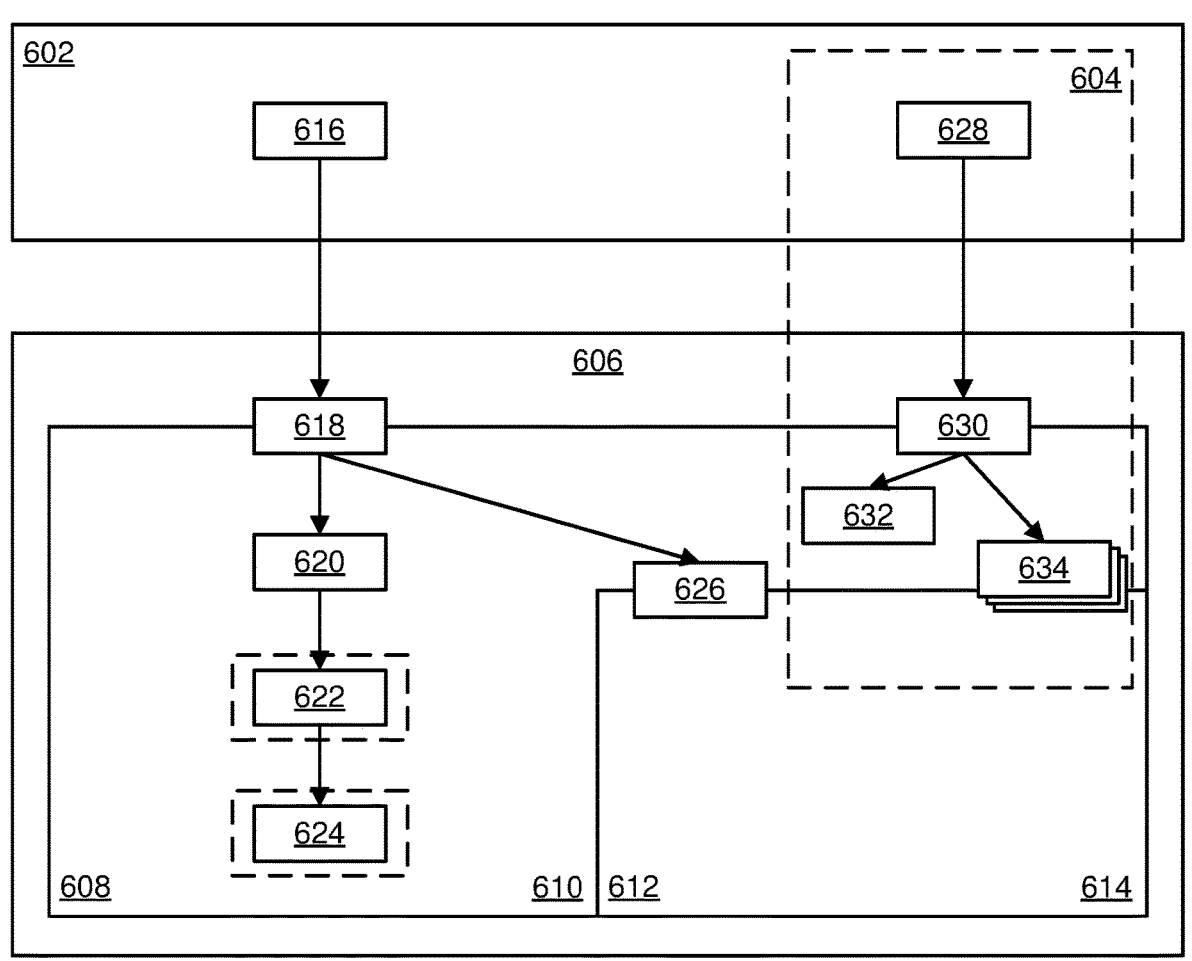

FIG. 6 is a schematic block diagram 600 illustrating another embodiment of a re-authentication key hierarchy. The schematic block diagram 600 illustrates an AMF 602, a first ME 604, trusted non-3GPP ("N3GPP") access keys 606, a TNGF 608, a second ME 610, a TNAP 612, and a third ME 614. The AMF 602 may transmit a $K_{TNGF}$ 616 to the trusted N3GPP access keys 606. The trusted N3GPP access keys 606 may use a $K_{TNGF}$ 618 to derive a $K_{TIPsec}$ 620 used to setup IPSec security association ("SA") 622 which is used to setup child SAs 624. The $K_{TNGF}$ 618 may also be used to derive $K_{TNAP}$ 626. The AMF 602 may transmit an rRK 628 to the TNGF 608. The TNGF 608 may use an rRK 630 to derive rIK 632 and to derive rMSKi 634. Moreover, the third ME 614 derives rIK 632 and rMSKi 634 from the rRK 630.

In some embodiments, various inputs may be used for re-authentication security context derivation (e.g., rRK, sRK, $K_{TNGF}$, $K_{TNAN}$, rIK, rMSK, and/or $K_{TNAP}$ keys) following a re-authentication layout, such as in Figure.

Figure 7:
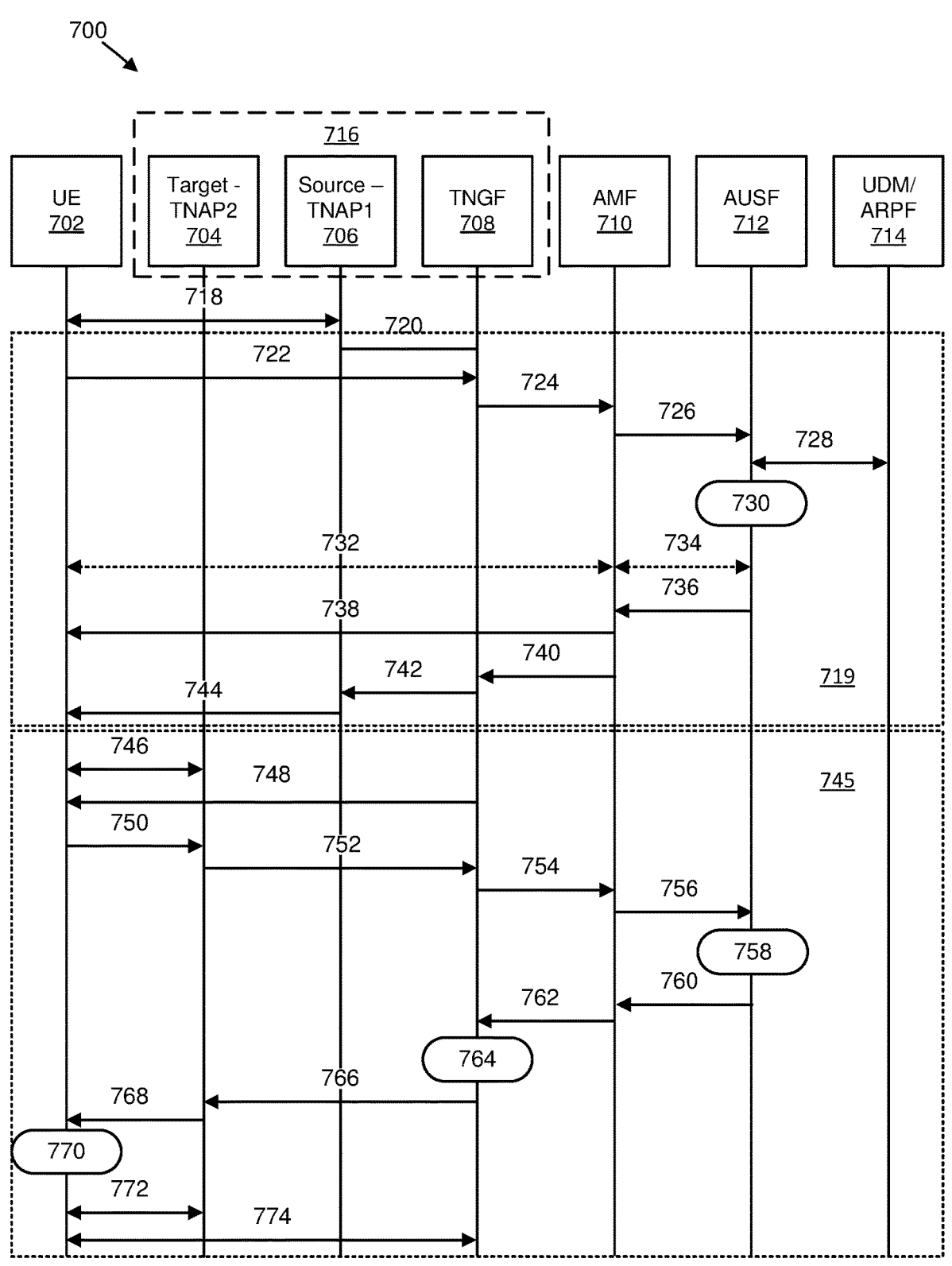
FIG. 7 is a communications diagram illustrating one embodiment of communications for key generation and distribution.

FIG. 7 is a communications diagram illustrating one embodiment of communications 700 for key generation and distribution. The communications 700 include messages transmitted between a UE 702, a target-TNAP2 704, a source-TNAP1 706, a TNGF 708, an AMF 710, an AUSF 712, and a UDM/authentication credential repository and processing function ("ARPF") 714. The target-TNAP2 704, the source-TNAP1 706, and the TNGF 708 may all be part of a TNAN 716. As may be appreciated, any of the communications 700 may include one or more messages.

In some embodiments, the communications 700 involved in an ERP based re-authentication following a primary authentication are described with pre-requisite communications corresponding to primary authentication.

In a first communication 718 transmitted between the UE 702 and the source-TNAP1 706, layer-2 ("L2") connection setup is performed. The communications 700 include a successful primary authentication using an EAP method 719. Moreover, in a second communication 720 transmitted from the source-TNAP1 706 to the TNGF 708, the source-TNAP1 706 transmits over an AAA interface.

Specifically, in the first communication 718 and the second communication 720, the UE 702 selects a PLMN and the TNAN 716 using a trusted non-3GPP access network selection procedure and an L2 connection is establishment between the UE 702 and the TNAP (e.g., the source-TNAP1 706). An EAP authentication procedure is initiated and the EAP messages are encapsulated into the L2 packets. The UE 702 provides an NAI that triggers the TNAP to send an AAA request to the TNGF 708. Between the TNAP and the TNGF 708 the EAP packets are encapsulated into AAA messages.

In a third communication 722 transmitted from the UE 702 to the TNGF 708, the UE 702 transmits a registration request over an L2 interface to the TNGF 708. Moreover, in a fourth communication 724 transmitted from the TNGF 708 to the AMF 710, the TNGF 708 transmits the registration request over an N2 interface to the AMF 710. Specifically, in the third communication 722 and the fourth communication 724, an EAP-5G procedure is executed over the L2 connection and the UE 702 sends the registration request message over the L2 interface to the TNGF 708 and the TNGF 708 forwards the registration request received from the UE 702 to the AMF 710 over the N2 interface with a TNGF ID. If the AMF 710 receives a 5G globally unique temporary identifier ("5G-GUTI") and the registration is integrity protected, the AMF 710 may use the security context to verify the integrity protection.

In a fifth communication 726 transmitted from the AMF 710 to the AUSF 712, if the AMF 710 decides to authenticate the UE 702, the AMF 710 sends a key request (e.g., AAA key request, subscription permanent identifier ("SUPI"), subscription concealed identifier ("SUCI")) to the AUSF 712 along with the TNGF ID. In a sixth communication 728 transmitted between the AUSF 712 and the UDM/ARPF 714, the AUSF 712 may initiate an authentication procedure (e.g., authentication request and/or response) involving the UDM/ARPF 714 using either EAP-AKA' or 5G AKA. Between the AMF 710 and the UE 701, authentication packets are encapsulated within non-access stratum ("NAS") authentication messages and the NAS authentication messages are carried in N2 signaling between the AMF 710 and the TNGF 708, and then are encapsulated within EAP-5G/5G-NAS packets between the TNGF 708 and the UE 702.

In a final authentication message from the home network, considering the trusted access based indicator and/or TNGF identifier ("ID") if the authentication selected and executed is EAP-AKA' by the UDM/ARPF 714, and if the UDM indicates to AUSF 712 that EAP-AKA' is selected as the authentication method, the AUSF 712 assigns 730 an indicator next generation ("NG") Re-authentication Key Set ID ("ng-RKSI") to identify the EMSK for later use such as a re-authentication use case and stores the EMSK locally. In a seventh communication 732 transmitted between the UE 702 and the AMF 710, and in an eighth communication 734 transmitted between the AMF 710 and the AUSF 712, authentication and/or key agreement messages may be transmitted.

In a ninth communication 736 transmitted from the AUSF 712 to the AMF 710, the AUSF 712 then sends the derived re-authentication security context identifier ng-RKSI along with the anchor key $K_{SEAF}$ derived from $K_{AUSF}$ to the security anchor functionality ("SEAF") in a key response message. As may be appreciated, rRK may also be sent along with the ng-RKSI.

The SEAF may derive the $K_{AMF}$ from $K_{SEAF}$ and send $K_{AMF}$ to the AMF 710 which is used by the AMF 710 to derive NAS security keys along with ng-RKSI. It should be noted that the AMF 710 may receive rRK along with ng-RKSI. If EAP-AKA' is used for authentication, then the AUSF 710 also include an EAP success indicator. The UE 702 also derives the anchor key $K_{SEAF}$ and from that key it derives the $K_{AMF}$ followed by NAS security keys. In a tenth communication 738 transmitted from the AMF 710 to the UE 702, the AMF 710 sends a security mode command ("SMC") to the UE 702 to activate NAS security. The tenth communication 738 may be first sent to the TNGF 708 (within an N2 message). If EAP-AKA' is used for authentication, the AMF 710 encapsulates the EAP success indicator received from the AUSF 710 within the SMC message.

The TNGF 708 forwards the NAS SMC to the UE 702 within an EAP-Request/5G-NAS packet. The UE 702 completes the authentication and creates an NAS security context or activates another one based on the received ngKSI in the NAS SMC. The UE 702 encapsulates the NAS SMC complete in the EAP-5G response. The TNGF 708 forward the NAS packet containing NAS SMC complete to the AMF 710 over the N2 interface.

The AMF 710, upon reception of the NAS SMC complete from the UE 702 or upon success of integrity protection verification, initiates the next generation application protocol ("NGAP") procedure to setup the AN context. In an eleventh communication 740 transmitted from the AMF 710 to the TNGF 708, the AMF 710 further compute the TNGF key ("$K_{TNGF}$") and sends $K_{TNGF}$ and ng-RKSI received from the AMF 710 in an NGAP initial context setup request to the TNGF 708. The AMF 710 may also provide rRK with the ng-RKSI.

In a twelfth communication 742 transmitted from the TNGF 708 to the source-TNAP1 706, the TNGF 708 sends an EAP-Success/EAP-5G toward the UE 702 upon reception of the NGAP initial context setup request containing the TNGF key, $K_{TNGF}$, and ng-RKSI. This completes the EAP-5G session and no further EAP-5G packets are exchanged. If the TNGF 708 does not receive the $K_{TNGF}$ from the AMF 710, the TNGF 708 responds with an EAP-Failure. The TNGF 708 locally stores ng-RKSI to support ERP based re-authentication. The TNGF 708 may also store rRK with ng-RKSI.

The TNGF 708 derives TNAP key ("$K_{TNAP}$") from $K_{TNGF}$ and sends the TNAP Key ($K_{TNAP}$) to the source-TNAP1 706 over the AAA interface along with the EAP success message. In a thirteenth communication 744 transmitted from the source-TNAP1 706 to the UE 702, the source-TNAP1 706 uses the $K_{TNAP}$ to derive keys for security establishment between the UE 702 and the source-TNAP1 706 and the source-TNAP1 706 transmits the EAP success message over L2 (including the ng-RKSI). The common TNAP key may be used by the UE 702 and the TNAP (e.g., source-TNAP1 706) to derive security keys according to an applied non-3GPP technology and to establish a security association to protect all subsequent traffic. If IEEE 802.11 is used, $K_{TNAP}$ is a pairwise master key ("PMK") and a 4-way handshake may be executed which establishes a security context between a WLAN AP and the UE 702 that is used to protect unicast and multicast traffic over the air. All messages between the UE 702 and the TNAP may be encrypted and integrity protected from this step onwards.

In some embodiments, the UE 702 receives an internet protocol ("IP") configuration from the TNAN 716 (e.g., with dynamic host configuration protocol ("DHCP")). The UE 702 may initiate an IKE_INIT exchange with the TNGF 708. In various embodiments, the UE 702 has received an IP address of the TNGF 708 within EAP-5G signaling In such embodiments, the UE 702 may initiate an IKE_AUTH exchange and provide its SUPI or 5G-GUTI identity. The common $K_{TNGF}$ may be used for mutual authentication. NULL encryption may be negotiated. An IPsec SA may be established between the UE 702 and the TNGF 708 (e.g., an NWt connection—NWt may be a reference point between the UE 702 and the TNGF 708—a secure NWt connection may be established over this reference point—NAS messages between the UE 702 and the AMF 710 may be transferred via the NWt connection) and may be used to transfer all subsequent NAS messages. The IPsec SA may not apply encryption but may only apply integrity protection. After the NWt connection is successfully established, the TNGF 708 responds to the AMF 710 with an N2 initial context setup response message. Finally, the NAS registration accept message may be sent by the AMF 710 and may be forwarded to the UE 702 via the established NWt connection along with ng-RKSI and TNGF ID. The UE 702 may locally store the ng-RKSI and TNGF ID.

If the UE 702 moves from a current TNAP to a different TNAP and if the TNGF 708 remains the same, an ERP based re-authentication procedure 745 may be used.

In a fourteenth communication 746 transmitted between the UE 702 and the target-TNAP2 704 and in a fifteenth communication 748 transmitted from the TNGF 708 to the UE 702, in response to the UE 702 moving to a new target TNAP which belongs to the same ERP domain as the domain of the source-TNAP1 706, an EAP re-authentication procedure may be initiated (e.g., via L2 connection setup). The UE 702 informs the target-TNAP2 704 that it supports ERP. The TNAP (e.g., TNGF 708) sends the EAP-Initiate and/or re-authentication start message to the UE 702 along with target TNAP ID.

In a sixteenth communication 750 transmitted from the UE 702 to the target-TNAP2 704, the UE 702 sends a registration request in an EAP-Initiate and/or re-authentication request over the L2 connection to the target-TNAP2 704 with the ng-RKSI.

In a seventeenth communication 752 transmitted from the target-TNAP2 704 to the TNGF 708, the target-TNAP2 704 forwards the registration request to the TNGF 708 over the AAA interface along with the ng-RKSI (e.g., in an EAP-Initiate and/or re-authentication request). In certain embodiments, the communications 700 may end here and one or more of the following communications 700 (e.g., 754, 756, 758, 760, 762) may not occur.

In an eighteenth communication 754 transmitted from the TNGF 708 to the AMF 710, the TNGF 708 sends the AMF 710 an N2 NAS registration request (e.g., in an EAP-Initiate and/or re-authentication request) with an ERP Request, the TNGF ID, and the ng-RKSI which indicates that an EAP re-authentication root key ("rRK") is needed.

In a nineteenth communication 756 transmitted from the AMF 710 to the AUSF 712, the AMF 710 sends an AAA key request (e.g., in an EAP-Initiate and/or re-authentication request) to the AUSF 712 along with the SUPI, the received TNGF ID, and the ng-RKSI.

The AUSF 712 fetches 758 the EMSK corresponding to the ng-RKSI. The AUSF 712 then may use the TNGF ID, if available, and the EMSK to derive a domain specific root key ("DSRK") and derives the rRK from the EMSK (or DSRK, if available) as specified in an rRK derivation or the 256 least significant bits of EMSK are taken as rRK. The AUSF 712 may derive a serving network re-authentication key ("sRK") as specified in an sRK derivation.

In a twentieth communication 760 transmitted from the AUSF 712 to the AMF 710, the AUSF 712 provides SEAF Key, rRK, DSRK, rSK, and/or an EAP success indication in an AAA key response message along with an EAP-Initiate and/or re-authentication response.

In a twenty-first communication 762 transmitted from the AMF 710 to the TNGF 708, the AMF 710 provides an N2 registration response to the TNGF 708 along with the received re-authentication security context including rRK, DSRK, sRK, and/or $K_{TNGF}$ (e.g., with an EAP-Initiate and/or re-authentication response).

The TNGF 708 derives 764 the rIK, the rMSK, and/or the TNAP key ("KTNAP") specific to the TNAP ID from the rRK, DSRK, and/or sRK based on the key derivation inputs described herein.

The EAP-Initiate and/or re-authentication request and/or response may be integrity protected using the re-authentication integrity keys ("rIK") created independently in the UE 702 and in the TNGF 708. If these integrity keys are the same, the EAP re-authentication procedure may be successful and the TNGF 708 may derive the $K_{TNAP}$ (specific to the target TNAP) and the re-authentication MSK ("rMSK") (e.g., $K_{TNAP}$ key is used to establish a security context between the UE 702 and the target-TNAP2 704 to setup access security).

In a twenty-second communication 766 transmitted from the TNGF 708 to the target-TNAP2 704, the TNGF 708 sends the EAP-Finish and/or re-authentication message in an AAA interface to the target-TNAP2 704 along with the derived TNAP key to setup access security (e.g., with the rMSK).

In a twenty-third communication 768 transmitted from the target-TNAP2 704 to the UE 702, the target-TNAP2 704 sends an EAP-Finish and/or re-authentication success message to the UE 702.

The UE 702, on receiving an ERP success message, derives 770 the EAP re-authentication keys such as rRK, DSRK, sRK, and/or rIK. The UE 702 also derives the $K_{TNAP}$ (e.g., specific to the target-TNAP2 704 using TNAP ID in $K_{TNAP}$ key derivation), and the $K_{TNAP}$ is defined to be used as rMSK.

In a twenty-fourth communication 772 transmitted between the UE 702 and the target-TNAP2 704, security establishment using derived keys is performed. The IP address allocated to the UE 702 may not change during a mobility event. Therefore, in a twenty-fifth communication 774 transmitted between the UE 702 and the TNGF 708, the UE 702 may use the same IP address to resume communication with the TNGF 708 over the existing NWt connection.

Figure 8:
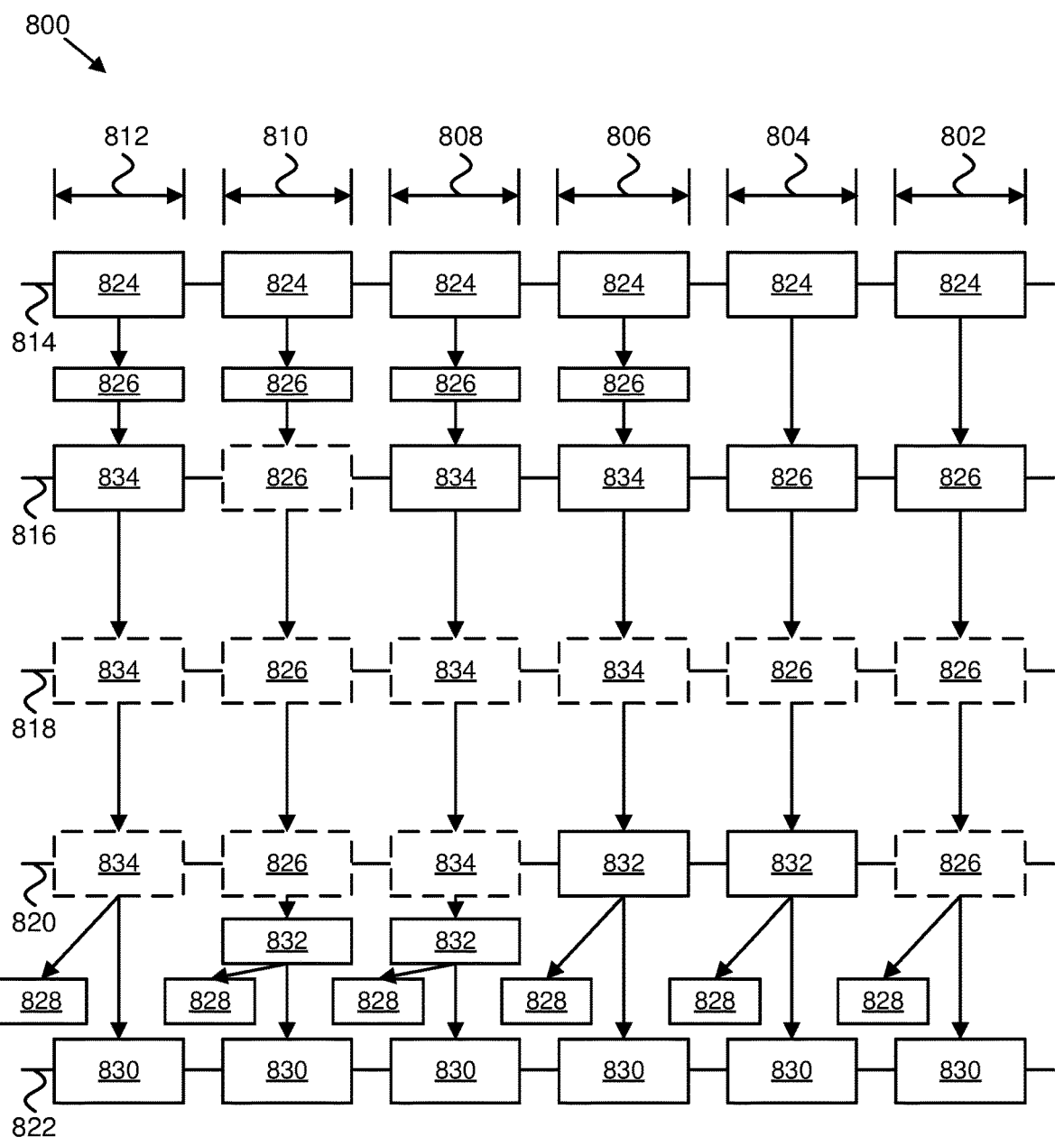
FIG. 8 is a schematic block diagram illustrating a further embodiment of key hierarchy.

FIG. 8 is a schematic block diagram 800 illustrating a further embodiment of key hierarchy. The schematic block diagram 800 includes a first option 802, a second option 804, a third option 806, a fourth option 808, a fifth option 810, and a sixth option 812 for key derivation. The steps of key derivation may be performed by an AUSF and UE 814 of a home public land mobile network ("HPLMN"), an SEAF and UE 816 of a visiting public land mobile network ("VPLMN"), an AMF and UE 818, a TNGF and UE 820, and a TNAP and UE 822. The keys that are part of the key derivation include an extended master session key ("EMSK") 824 that is derived and provisioned during primary authentication, and the following keys that are derived during ERP re-authentication: re-authentication root key ("rRK") and/or DSRK 826, re-authentication integrity key ("rIK") 828, re-authentication master session key ("rMSK") and/or TNAP key ("$K_{TNAP}$") 830, re-authentication root key ("$K_{RTNGF}$") 832, and serving network re-authentication key ("sRK") 834.

The key derivation shown in FIG. 8 is elaborated herein with inputs required for every key generation involved in the key hierarchy along with locations of key generation. The boxes in FIG. 8 with dotted lines show only key transport and not key derivation. The locations of key derivations are shown with solid lines.

In some embodiments corresponding to DSRK derivation, a domain name is used as an input and a remaining key derivation may be the same as for rRK derivation.

In the first option 802 rRK derivation may be by AUSF and ME and/or UE: rRK and/or DSRK 826 is the 256 least significant bits of EMSK 824.

In the second option 804 rRK derivation may be by AUSF and ME and/or UE: rRK: KDF (K, S), where K=EMSK, and S may be one or more of the following parameters: PLMN ID, serving network name ("SN Name"), trusted network domain name, TNGF ID, SUPI, NAI, UE ID, re-authentication code, rRK label, separator "\0", and/or length of each 'S' parameter. As may be appreciated, rRK may be derived by the AUSF and ME using EMSK and one or more of the above inputs to a key derivation function ("KDF").

In the third option 806: derived only by SEAF and UE: rRK: KDF (K, S), where K=K$_{SEAF}$, and S may be one or more of the following parameters: SN Name, trusted network domain name, TNGF ID, SUPI, NAI, UE ID, re-authentication code, rRK label, separator "\0", and/or length of each 'S' parameter. It should be noted that rRK may be derived by the AUSF and ME using EMSK and one or more of the above inputs to the KDF.

In various embodiments, sRK derivation may be performed by AUSF and/or SEAF and ME and/or UE (e.g., derived optionally considering home network policy if the HPLMN does not prefer to provide rRK to the VPLMN) and may be as follows: sRK: KDF (K, S), where K=rRK and/or DSRK, and S may be one or more of the following parameters: SN Name, trusted network domain name, TNGF ID, SUPI, NAI, UE ID, re-authentication code, rSK label, separator "\0", and/or length of each 'S' parameter.

In some embodiments, rIK derivation may be by TNGF and ME and/or UE and may be as follows: rIK: KDF (K, S), where K=rRK, DSRK, sRK, and/or K$_{RTNGF}$, and S may be one or more of the following parameters: TNGF ID, UE ID, re-authentication code, rIK label, anti-bidding down between architectures ("ABBA") parameter, separator "\0", and/or length of each 'S' parameter. As may be appreciated, TNGF and/or TNAN re-authentication key ("K$_{RTNGF}$") generation may be done by an access and mobility management function ("AMF") from sRK, rRK, and/or DSRK provided by an AUSF through SEAF. Similarly, a UE and/or ME may derive K$_{RTNG}$ as a network.

In certain embodiments, rMSK or TNAP key derivation may be performed by TNGF and ME and/or UE.

In one embodiment, rMSK and/or K$_{TNAP}$ may be derived from rRK and/or DSRK provided by an AUSF in which: rMSK: KDF (K, S), where K=rRK, and S can be any one or more of the following parameters: TNAP ID, TNAP specific information, TNAP mobility counter, ABBA parameter, separator "\0", and/or length of each 'S' parameter. In such embodiments, the TNAP mobility counter may be initialized to 0 at the UE and the TNGF. For every new rMSK and/or TNAP key generation from the same rRK, the TNAP mobility counter may be incremented by both the UE and the TNGF.

In another embodiment, rMSK and/or K$_{TNAP}$ may be derived from a K$_{RTNGF}$ key provided by an AMF. AUSF may derive rRK and/or DSRK and may provide rRK and/or DSRK to the AMF. The AMF may derive K$_{RTNGF}$ from rRK. K$_{TNGF}$: KDF (rRK, sRK, and/or DSRK, TNGF ID), rMSK: KDF (K, S), where K=K$_{RTNGF}$, and S may be one or more of the following parameters: TNAP ID, TNAP specific information, TNAP mobility counter, separator "\0", and/or length of each 'S' parameter. In such embodiments, the TNAP mobility counter may be synchronized by the TNGF with the UE by sending the TNAP mobility counter to the UE (e.g., in AAA along with an EAP and/or ERP success message or during any ERP request message).

In some embodiments, rMSK and/or K$_{TNAP}$ may be derived from rRK, TNGF may provide TNGF ID to AUSF, AUSF may derive rRK including TNGF ID or AMF PLMN ID in KDF, AUSF may provide rRK to AMF and TNGF, and/or TNGF derives rMSK from rRK in which rMSK: KDF (K, S), where K=rRK, and S may be one or more of the following parameters: TNAP ID, TNAP specific information, TNAP mobility counter, ABBA parameter, SEQ, separator "\0", and/or a length of each 'S' parameter.

In certain embodiments, rRK may be derived in AUSF and used with TNAP ID to derive rMSK in TNGF.

Figure 9:
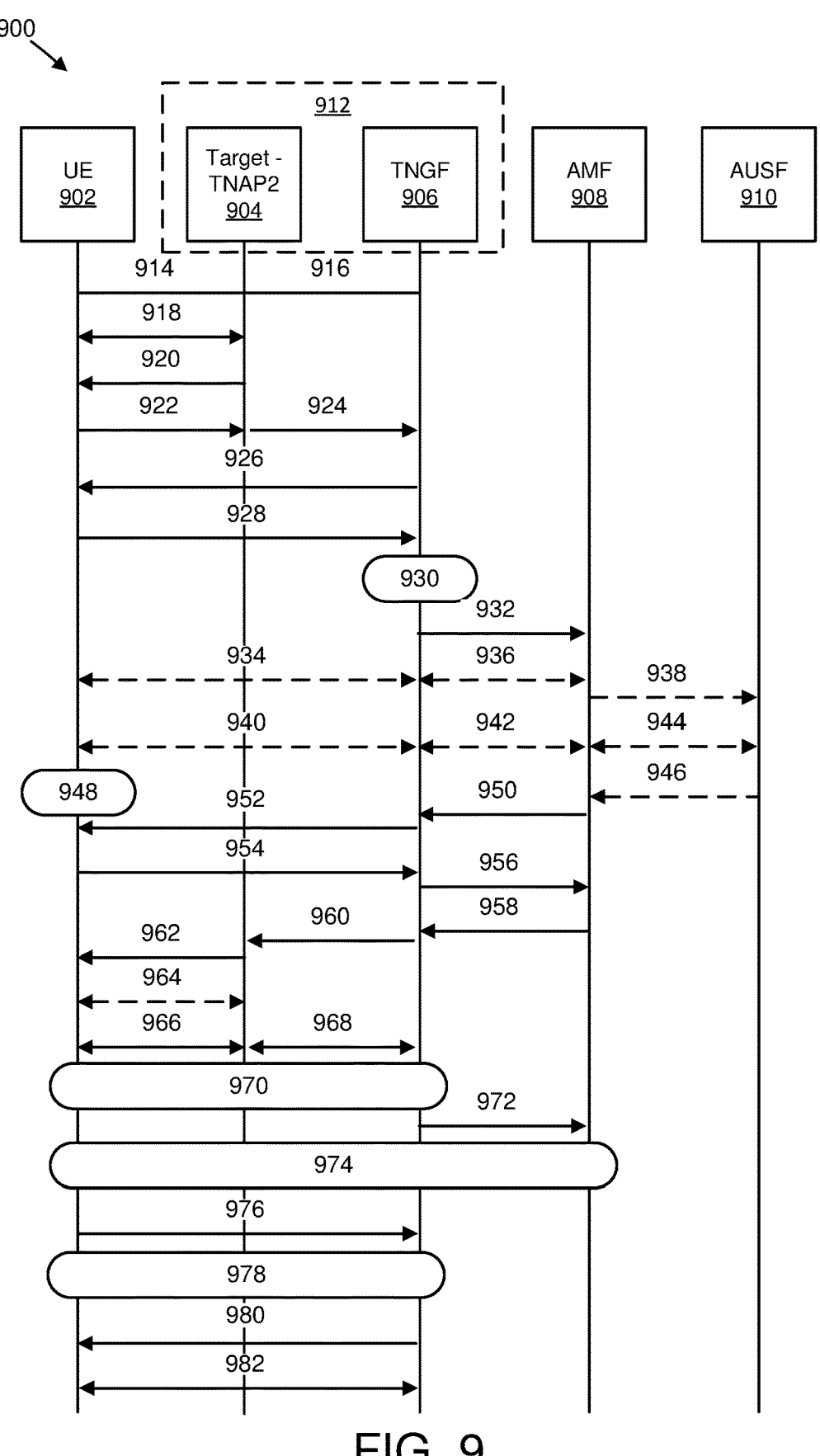
FIG. 9 is a communications diagram illustrating another embodiment of communications for key generation and distribution.

FIG. 9 is a communications diagram illustrating another embodiment of communications 900 for key generation and distribution. The communications 900 include messages transmitted between a UE 902, a target-TNAP2 904, a TNGF 906, an AMF 908, and an AUSF 910. The target-TNAP2 904 and the TNGF 906 may all be part of a TNAN 912. As may be appreciated, any of the communications 900 may include one or more messages.

In a first communication 914 transmitted between the UE 902 and the target-TNAP2 904, L2 interface based communications may be made (e.g., Ethernet, 902.3, 902.11, PPP). In a second communication 916 transmitted between the target-TNAP2 904 and the TNGF 906 communications may be made over an AAA interface.

In a third communication 918 transmitted between the UE 902 and the target-TNAP2 904, an L2 connection may be established. In a fourth communication 920 transmitted from the target-TNAP2 904 to the UE 902, the target-TNAP2 904 may transmit an EAP request and/or identify message to the UE 902 using the L2 interface. In a fifth communication 922 transmitted from the UE 902 to the target-TNAP2 904, the UE 902 may transmit an EAP response and/or identify (e.g., including username@realm) message to the target-TNAP2 904 using the L2 interface. In a sixth communication 924 transmitted from the target-TNAP2 904 to the TNGF 906, the target-TNAP2 904 may forward the EAP response and/or identify message to the TNGF 906 using the AAA interface.

In a seventh communication 926 transmitted from the TNGF 906 to the UE 902, the TNGF 906 may transmit an EAP request and/or 5G start message to the UE 902 using the L2 interface. In an eighth communication 928 transmitted from the UE 902 to the TNGF 906, the UE 902 may transmit an EAP response and/or 5G NAS message to the TNGF 906 using the L2 interface. The EAP response and/or 5G NAS message may include AN parameters (e.g., single network slice selection assistance information ("S-NSSAI"), SUCI, 5G-GUTI, etc.) and/or NAS-PDU information (e.g., registration request). In certain embodiments, the communications 900 may end here and one or more of the following communications 900 (e.g., 932, etc.) may not occur.

The TNGF 906 may perform 930 an AMF selection. In a ninth communication 932 transmitted from the TNGF 906 to the AMF 908, the TNGF 906 may transmit an N2 message (e.g., registration request). If the trusted non-3GPP access network supports ERP, then the TNGF 906 may send an ERP request together with the registration request to the AMF 908.

In a tenth communication 934 (optional) transmitted between the UE 902 and the TNGF 906, an EAP request, response, 5G NAS, and/or NAS protocol data unit ("PDU") (e.g., identity request and/or response) may be transmitted. In an eleventh communication 936 (optional) transmitted between the TNGF 906 and the AMF 908, an N2 message (e.g., identity request and/or response) may be transmitted.

In a twelfth communication 938 (optional) transmitted from the AMF 908 to the AUSF 910, the AMF 908 may transmit an AAA key request to the AUSF 910 (e.g., SUPI, SUCI) (e.g., message from the ninth communication 932 forwarded from the AMF 908 to the AUSF 910).

The AUSF 910 may not send a response to an ERP request if it does not support ERP or if it selects 5G-AKA as an authentication method. The AUSF 910 only sends a response if it supports ERP and the selected authentication method is EAP-AKA'. In such a case, the AUSF 910 derives the EAP re-authentication root key rRK from the EMSK and provides it to the AMF 908 together with an SEAF key in communication 946. The rRK key is further send from the AMF 908 to the TNGF 906 together with the TNGF 906 key in communication 958.

If the TNGF 906 sends an ERP request but does not receive an rRK in communication 958, then the ERP exchange cannot be performed and the UE 902 may initiate a full re-authentication after moving to a new TNAP.

The TNGF 906 may derive the rIK and rMSK from the rRK per TNAP and the UE 902 may derive the keys accordingly as well.

In a thirteenth communication 940 transmitted between the UE 902 and the TNGF 906, a fourteenth communication 942 transmitted between the TNGF 906 and the AMF 908, and/or a fifteenth communication 944 transmitted between the AMF 908 and the AUSF 910, authentication and/or key agreement information may be transmitted and/or received.

In a sixteenth communication 946 transmitted from the AUSF 910 to the AMF 908, the AUSF 910 may transmit an AAA key response to the AMF 908 (e.g., SEAF key, EAP success message). The UE 902 may create 948 TNGF and/or TNAP keys.

In a seventeenth communication 950 transmitted from the AMF 908 to the TNGF 906, the AMF 908 may transmit an N2 message (e.g., SMC request, EAP success message) to the TNGF 906. In an eighteenth communication 952 transmitted from the TNGF 906 to the UE 902, the TNGF 906 may transmit a message over the L2 interface (e.g., EAP request, 5G NAS, NAS PDU, SMC request, EAP success, TNGF address) to the UE 902.

In a nineteenth communication 954 transmitted from the UE 902 to the TNGF 906, the UE 902 may transmit a message over the L2 interface (e.g., EAP response, 5G NAS, NAS PDU, SMC complete) to the TNGF 906. In a twentieth communication 956 transmitted from the TNGF 906 to the AMF 908, the TNGF 906 may transmit an N2 message (e.g., SMC complete) to the AMF 908. In a twenty-first communication 958 transmitted from the AMF 908 to the TNGF 906, the AMF 908 may transmit an N2 initial setup request (e.g., $K_{TNGF}$) to the TNGF 906. In a twenty-second communication 960 transmitted from the TNGF 906 to the target-TNAP2 904, the TNGF 906 transmits a message (e.g., MSK, EAP success) over an AAA interface to the target-TNAP2 904.

In a twenty-third communication 962 transmitted from the target-TNAP2 904 to the UE 902, the target-TNAP2 904 transmits a message over an L2 interface (e.g., EAP success) to the UE 902. In a twenty-fourth communication 964 (optional) transmitted between the UE 902 and the target-TNAP2 904, security establishment may be performed using a key derived from the MSK key (e.g., 4-way handshake for WLAN).

In a twenty-fifth communication 966 transmitted between the UE 902 and the target-TNAP2 904 and/or a twenty-sixth communication 968 transmitted between the target-TNAP2 904 and the TNGF 906, a local IP configuration may be made. In a twenty-seventh communication 970 transmitted between the UE 902 and the TNGF 906, IKE_INIT and IKE_AUTH messages may be transmitted (e.g., IDi, SA, TSi, TSr, AUTH).

In a twenty-eighth communication 972 transmitted from the TNGF 906 to the AMF 908, the TNGF 906 may transmit an N2 initial setup response message to the AMF 908. In a twenty-ninth communication 974 transmitted between the AMF 908, the TNGF 906, and the UE 902, an N2 message (e.g., NAS registration accept message) may be transmitted. In a thirtieth communication 976 transmitted from the UE 902 to the TNGF 906, the UE 902 may transmit a PDU session establishment request message (e.g., NAS over IPsec) to the TNGF 906. In a thirty-first communication 978 transmitted between the UE 902 and the TNGF 906, an IKE_Create_Child_SA_Request (e.g., SA, PDU session ID) and IKE_Create_Child_SA_Response may be transmitted and/or received.

In a thirty-second communication 980 transmitted from the TNGF 906 to the UE 902, the TNGF 906 may transmit a PDU session establishment acceptance message to the UE 902. In a thirty-third communication 982 transmitted from the UE 902 to the TNGF 906, IP, ESP, generic routing encapsulation ("GRE"), and/or PDU data may be transmitted.

Figure 10:
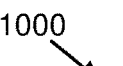
FIG. 10 is a schematic block diagram illustrating yet another embodiment of key hierarchy.
Figure 10:
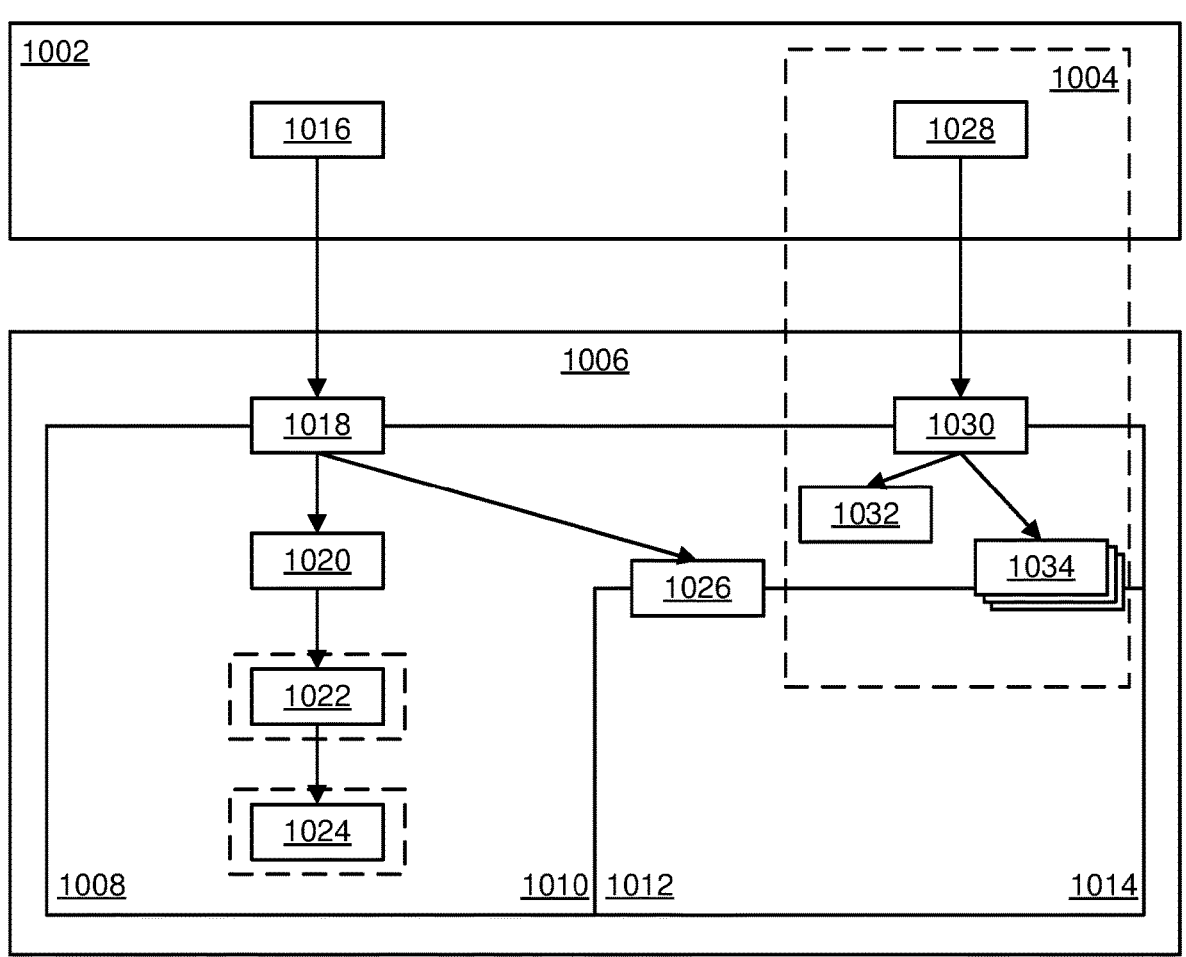

FIG. 10 is a schematic block diagram 1000 illustrating yet another embodiment of key hierarchy. The schematic block diagram 1000 illustrates an AMF 1002, a first ME 1004, trusted N3GPP access keys 1006, a TNGF 1008, a second ME 1010, a TNAP 1012, and a third ME 1014. The AMF 1002 may transmit a $K_{TNGF}$ 1016 to the trusted N3GPP access keys 1006. The trusted N3GPP access keys 1006 may use a $K_{TNGF}$ 1018 to derive a $K_{TIPSec}$ 1020 used to setup IPSec SA 1022 which is used to setup child SAs 1024. The $K_{TNGF}$ 1018 may also be used to derive $K_{TNAP}$ 1026. The AMF 1002 may transmit an rRK 1028 to TNGF 1008. The TNGF 1008 may use an rRK 1030 to derive rIK 1032 and to derive rMSKi 1034. Moreover, the third ME 1014 derives rIK 1032 and rMSKi 1034 from the rRK 1030.

If ERP is supported for EAP-AKA', then the EAP re-authentication root key rRK may be derived from the EMSK in the AUSF and provided to the TNGF 1008 via the AMF 1002. The subsequent re-authentication MSK (rMSK) keys and the integrity protection key for the ERP messages may be derived in the ME and the TNGF from rRK. The rMSK may act as the TNAP key and be used to setup access security.

In various embodiments, there may be an rRK derivation function. If deriving an rRK from EMSK (e.g., for EAP-AKA' only) the following parameters may be used to form the input S to the KDF, where FC=TBD, P0=rRK label, and/or L0=length of rRK label. The FC value may be specified. The input key KEY may be the EMSK. The rRK label may be an IANA-assigned 8-bit American standard code for information interchange ("ASCII") string "EAP Re-authentication Root Key@ietf.org" followed by a separator "\0" assigned from the "USRK Key Labels" name space.

In certain embodiments, there may be an rIK derivation function. If deriving an rIK from rRK the following parameters may be used to form the input S to the KDF, where FC=TBD, P0=rIK label, L0=length or rIK label, P1=cryptosuite, and/or L1=length of cryptosuite. The FC value may be specified. The rIK label may be 8-bit ASCII string "Re-authentication Integrity Key@ietf.org" followed by a separator "\0". The cryptosuite may be one of the algorithms "128-NIA1", "128-NIA2", and "128-NIA3". The input key KEY may be the rRK.

In some embodiments, there may be an rMSK derivation function. If deriving an rMSK from rRK the following parameters may be used to form the input S to the KDF, where FC=TBD, P0=TNAP identifier, L0=length of TNAP identifier, P1=sequence number SEQ, and/or L1=length of SEQ. The FC may be specified. The TNAP identifier may be an 8-bit ASCII string followed by a separator "\0". The sequence number SEQ may be a sequence of ERP messages. The input key KEY may be the rRK.

In various embodiments, a re-authentication security context derived for trusted non-3GPP access may be bounded to a serving trusted non-3GPP network and trusted non-3GPP access point. In such embodiments, the re-authentication security context if used for TNAP mobility may facilitate forward secrecy, backward secrecy, and/or key separation among the access points.

Figure 11:
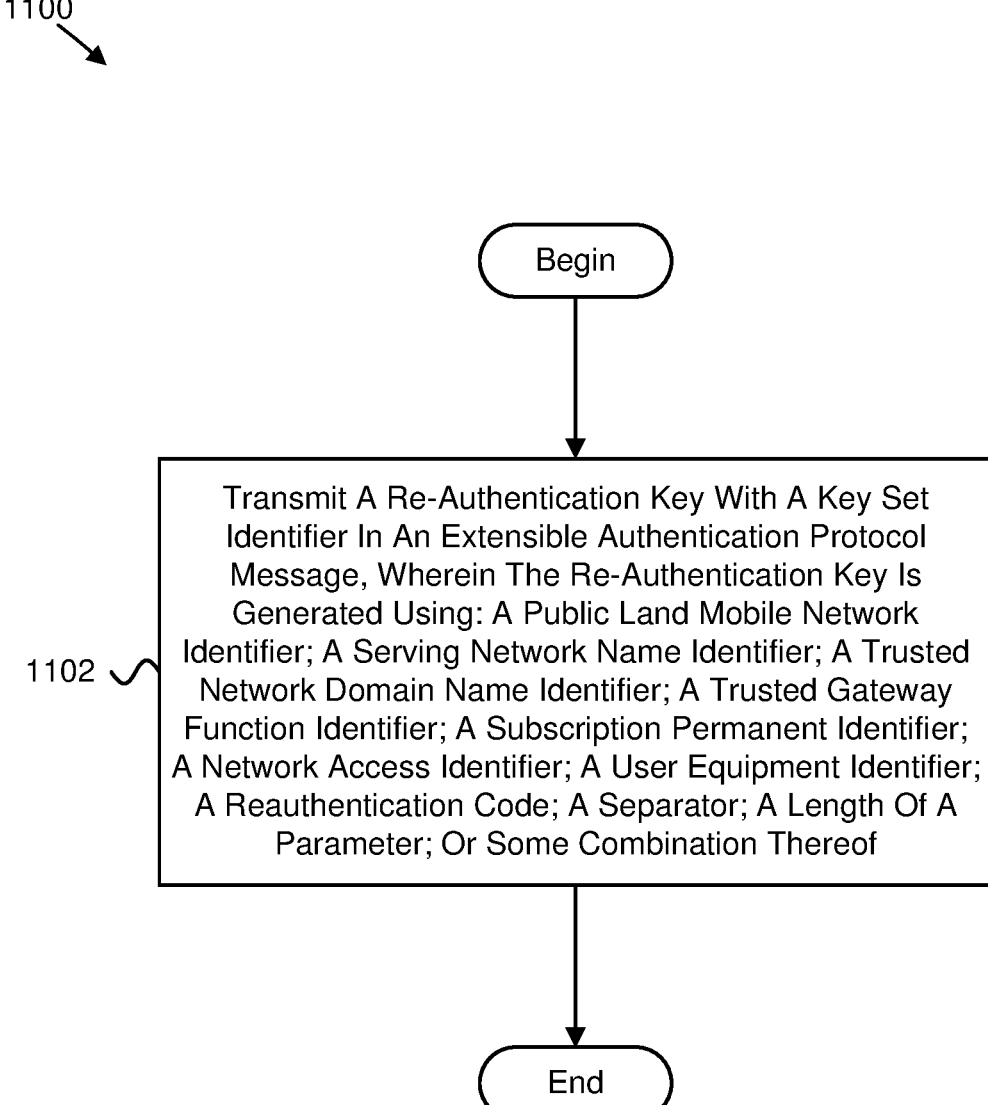
FIG. 11 is a flow chart diagram illustrating one embodiment of a method for re-authentication key generation.

FIG. 11 is a flow chart diagram illustrating one embodiment of a method 1100 for re-authentication key generation. In some embodiments, the method 1100 is performed by an apparatus, such as the remote unit 102 and/or the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes transmitting 1102 a re-authentication key with a key set identifier in an extensible authentication protocol message The re-authentication key is generated using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; or some combination thereof.

In certain embodiments, transmitting the re-authentication key with the key set identifier in the extensible authentical protocol message comprises transmitting the re-authentication key from an authentication server function to a security anchor functionality. In some embodiments, the re-authentication key comprises a re-authentication root key, a domain-specific root key, or a serving network re-authentication key. In various embodiments, the separator comprises "\0".

In one embodiment, the length of the parameter comprises a length of each S parameter of a set of S parameters. In certain embodiments, the set of S parameters comprises: the public land mobile network identifier; the serving network name identifier; the trusted network domain name identifier; the trusted gateway function identifier; the subscription permanent identifier; the network access identifier; the user equipment identifier; the reauthentication code; the separator; or some combination thereof. In some embodiments, the re-authentication key is generated by a key derivation function of an authentication server function, a home public land mobile network, or a combination thereof.

In various embodiments, a re-authentication integrity key is generated using the trusted gateway function identifier, the user equipment identifier, the reauthentication code, a re-authentication integrity key label, an anti-bidding down between architecture parameter, the separator, the length of the parameter, or some combination thereof. In one embodiment, a trusted access point key or re-authentication master session key is generated using a trusted access point identifier, trusted access point information, a trusted access point mobility counter, an anti-bidding down between architecture parameter, the separator, the length of the parameter, or some combination thereof.

Figure 12:
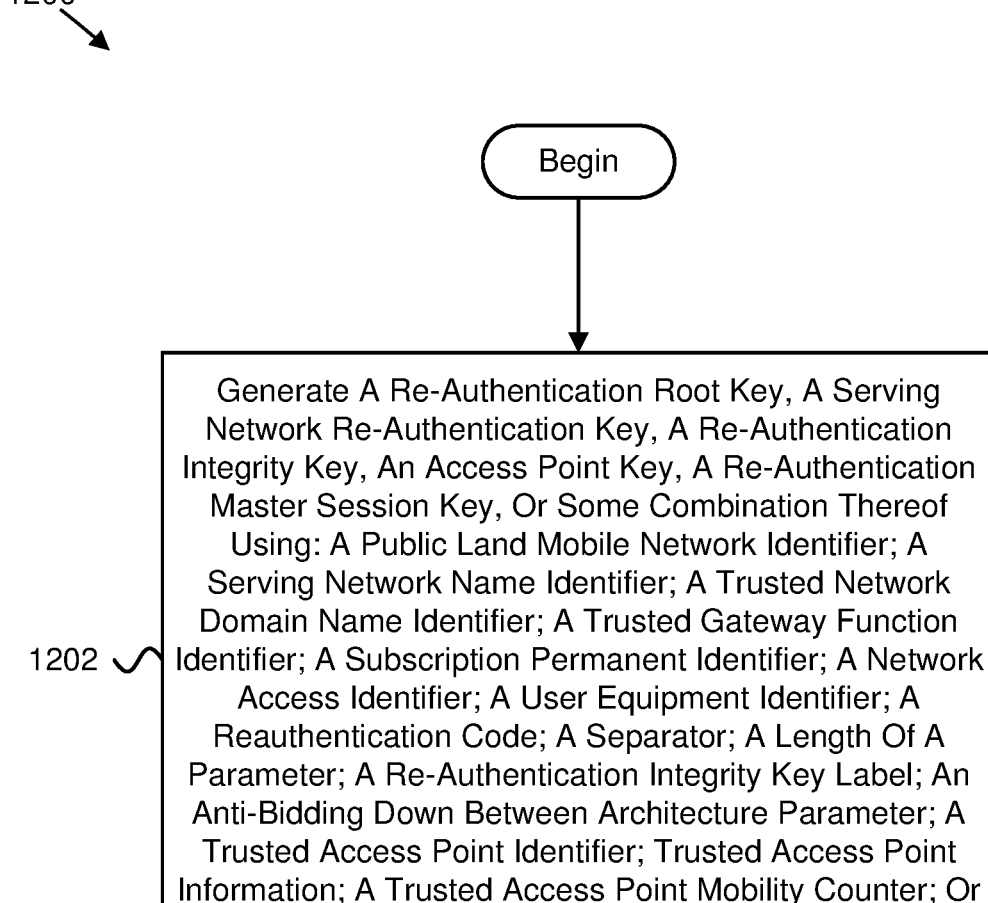
FIG. 12 is a flow chart diagram illustrating another embodiment of a method for re-authentication key generation.

FIG. 12 is a flow chart diagram illustrating another embodiment of a method 1200 for re-authentication key generation. In some embodiments, the method 1200 is performed by an apparatus, such as the remote unit 102 and/or the network unit 104. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes generating 1202 a re-authentication root key, a serving network re-authentication key, a re-authentication integrity key, an access point key, a re-authentication master session key, or some combination thereof using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; a re-authentication integrity key label; an anti-bidding down between architecture parameter; a trusted access point identifier; trusted access point information; a trusted access point mobility counter; or some combination thereof.

In certain embodiments, generating the re-authentication root key, the serving network re-authentication key, the re-authentication integrity key, the access point key, the re-authentication master session key, or some combination thereof comprises generating the re-authentication root key after a successful primary authentication. In some embodiments, generating the re-authentication root key, the serving network re-authentication key, the re-authentication integrity key, the access point key, the re-authentication master session key, or some combination thereof comprises generating the serving network re-authentication key during re-authentication. In various embodiments, generating the re-authentication root key, the serving network re-authentication key, the re-authentication integrity key, the access point key, the re-authentication master session key, or some combination thereof comprises generating the re-authentication integrity key during re-authentication.

In one embodiment, generating the re-authentication root key, the serving network re-authentication key, the re-authentication integrity key, the access point key, the re-authentication master session key, or some combination thereof comprises generating the access point key, the re-authentication master session key, or some combination thereof during re-authentication or in response to a re-authentication request. In certain embodiments, the separator comprises "\0". In some embodiments, the length of the parameter comprises a length of each S parameter of a set of S parameters.

In various embodiments, the set of S parameters comprises: the public land mobile network identifier; the serving network name identifier; the trusted network domain name identifier; the trusted gateway function identifier; the subscription permanent identifier; the network access identifier; the user equipment identifier; the reauthentication code; the separator; the re-authentication integrity key label; the anti-bidding down between architecture parameter; the trusted access point identifier; the trusted access point information; the trusted access point mobility counter; or some combination thereof. In one embodiment, the method 1200 further comprises receiving a re-authentication key set identifier, trusted access point identification information, and trusted gateway function identification information in an extensible authentication protocol success message.

In certain embodiments, the method 1200 further comprises receiving an extensible authentication protocol initiate re-authentication start message along with a target trusted access point identifier. In some embodiments, the method 1200 further comprises transmitting a registration request to a target trusted access point with a re-authentication key set identifier. In various embodiments, the registration request is transmitted in an extensible authentication protocol initiate request or a re-authentication request.

In one embodiment, a method comprises: transmitting a re-authentication key with a key set identifier in an extensible authentication protocol message, wherein the re-authentication key is generated using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; or some combination thereof.

In certain embodiments, transmitting the re-authentication key with the key set identifier in the extensible authentical protocol message comprises transmitting the re-authentication key from an authentication server function to a security anchor functionality.

In some embodiments, the re-authentication key comprises a re-authentication root key, a domain-specific root key, or a serving network re-authentication key.

In various embodiments, the separator comprises "\0".

In one embodiment, the length of the parameter comprises a length of each S parameter of a set of S parameters.

In certain embodiments, the set of S parameters comprises: the public land mobile network identifier; the serving network name identifier; the trusted network domain name identifier; the trusted gateway function identifier; the subscription permanent identifier; the network access identifier; the user equipment identifier; the reauthentication code; the separator; or some combination thereof.

In some embodiments, the re-authentication key is generated by a key derivation function of an authentication server function, a home public land mobile network, or a combination thereof.

In various embodiments, a re-authentication integrity key is generated using the trusted gateway function identifier, the user equipment identifier, the reauthentication code, a re-authentication integrity key label, an anti-bidding down between architecture parameter, the separator, the length of the parameter, or some combination thereof.

In one embodiment, a trusted access point key or re-authentication master session key is generated using a trusted access point identifier, trusted access point information, a trusted access point mobility counter, an anti-bidding down between architecture parameter, the separator, the length of the parameter, or some combination thereof.

In one embodiment, an apparatus comprises: a transmitter that transmits a re-authentication key with a key set identifier in an extensible authentication protocol message, wherein the re-authentication key is generated using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; or some combination thereof.

In certain embodiments, the transmitter transmitting the re-authentication key with the key set identifier in the extensible authentical protocol message comprises the transmitter transmitting the re-authentication key from an authentication server function to a security anchor functionality.

In some embodiments, the re-authentication key comprises a re-authentication root key, a domain-specific root key, or a serving network re-authentication key.

In various embodiments, the separator comprises "\0".

In one embodiment, the length of the parameter comprises a length of each S parameter of a set of S parameters.

In certain embodiments, the set of S parameters comprises: the public land mobile network identifier; the serving network name identifier; the trusted network domain name identifier; the trusted gateway function identifier; the subscription permanent identifier; the network access identifier; the user equipment identifier; the reauthentication code; the separator; or some combination thereof.

In some embodiments, the re-authentication key is generated by a key derivation function of an authentication server function, a home public land mobile network, or a combination thereof.

In various embodiments, a re-authentication integrity key is generated using the trusted gateway function identifier, the user equipment identifier, the reauthentication code, a re-authentication integrity key label, an anti-bidding down between architecture parameter, the separator, the length of the parameter, or some combination thereof.

In one embodiment, a trusted access point key or re-authentication master session key is generated using a trusted access point identifier, trusted access point information, a trusted access point mobility counter, an anti-bidding down between architecture parameter, the separator, the length of the parameter, or some combination thereof.

In one embodiment, a method comprises: generating a re-authentication root key, a serving network re-authentication key, a re-authentication integrity key, an access point key, a re-authentication master session key, or some combination thereof using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; a re-authentication integrity key label; an anti-bidding down between architecture parameter; a trusted access point identifier; trusted access point information; a trusted access point mobility counter; or some combination thereof.

In certain embodiments, generating the re-authentication root key, the serving network re-authentication key, the re-authentication integrity key, the access point key, the re-authentication master session key, or some combination thereof comprises generating the re-authentication root key after a successful primary authentication.

In some embodiments, generating the re-authentication root key, the serving network re-authentication key, the re-authentication integrity key, the access point key, the re-authentication master session key, or some combination thereof comprises generating the serving network re-authentication key during re-authentication.

In various embodiments, generating the re-authentication root key, the serving network re-authentication key, the re-authentication integrity key, the access point key, the re-authentication master session key, or some combination thereof comprises generating the re-authentication integrity key during re-authentication.

In one embodiment, generating the re-authentication root key, the serving network re-authentication key, the re-authentication integrity key, the access point key, the re-authentication integrity key, the access point key, the reauthentication master session key, or some combination thereof comprises generating the access point key, the re-authentication master session key, or some combination thereof during re-authentication or in response to a re-authentication request.

In certain embodiments, the separator comprises "\0".

In some embodiments, the length of the parameter comprises a length of each S parameter of a set of S parameters.

In various embodiments, the set of S parameters comprises: the public land mobile network identifier; the serving network name identifier; the trusted network domain name identifier; the trusted gateway function identifier; the subscription permanent identifier; the network access identifier; the user equipment identifier; the reauthentication code; the separator; the re-authentication integrity key label; the anti-bidding down between architecture parameter; the trusted access point identifier; the trusted access point information; the trusted access point mobility counter; or some combination thereof.

In one embodiment, the method further comprises receiving a re-authentication key set identifier, trusted access point identification information, and trusted gateway function identification information in an extensible authentication protocol success message.

In certain embodiments, the method further comprises receiving an extensible authentication protocol initiate re-authentication start message along with a target trusted access point identifier.

In some embodiments, the method further comprises transmitting a registration request to a target trusted access point with a re-authentication key set identifier.

In various embodiments, the registration request is transmitted in an extensible authentication protocol initiate request or a re-authentication request.

In one embodiment, an apparatus comprises: a processor that generates a re-authentication root key, a serving network re-authentication key, a re-authentication integrity key, an access point key, a re-authentication master session key, or some combination thereof using: a public land mobile network identifier; a serving network name identifier; a trusted network domain name identifier; a trusted gateway function identifier; a subscription permanent identifier; a network access identifier; a user equipment identifier; a reauthentication code; a separator; a length of a parameter; a re-authentication integrity key label; an anti-bidding down between architecture parameter; a trusted access point identifier; trusted access point information; a trusted access point mobility counter; or some combination thereof.

In certain embodiments, the processor generating the re-authentication root key, the serving network re-authentication key, the re-authentication integrity key, the access point key, the re-authentication master session key, or some combination thereof comprises the processor generating the re-authentication root key after a successful primary authentication.

In some embodiments, the processor generating the re-authentication root key, the serving network re-authentication key, the re-authentication integrity key, the access point key, the re-authentication master session key, or some combination thereof comprises the processor generating the serving network re-authentication key during re-authentication.

In various embodiments, the processor generating the re-authentication root key, the serving network re-authentication key, the re-authentication integrity key, the access point key, the re-authentication master session key, or some combination thereof comprises the processor generating the re-authentication integrity key during re-authentication.

In one embodiment, the processor generating the re-authentication root key, the serving network re-authentication key, the re-authentication integrity key, the access point key, the re-authentication master session key, or some combination thereof comprises the processor generating the access point key, the re-authentication master session key, or some combination thereof during re-authentication or in response to a re-authentication request.

In certain embodiments, the separator comprises "\0".

In some embodiments, the length of the parameter comprises a length of each S parameter of a set of S parameters.

In various embodiments, the set of S parameters comprises: the public land mobile network identifier; the serving network name identifier; the trusted network domain name identifier; the trusted gateway function identifier; the subscription permanent identifier; the network access identifier; the user equipment identifier; the reauthentication code; the separator; the re-authentication integrity key label; the anti-bidding down between architecture parameter; the trusted access point identifier; the trusted access point information; the trusted access point mobility counter; or some combination thereof.

In one embodiment, the apparatus further comprises a receiver that receives a re-authentication key set identifier, trusted access point identification information, and trusted gateway function identification information in an extensible authentication protocol success message.

In certain embodiments, the apparatus further comprises a receiver that receives an extensible authentication protocol initiate re-authentication start message along with a target trusted access point identifier.

In some embodiments, the apparatus further comprises a transmitter that transmits a registration request to a target trusted access point with a re-authentication key set identifier.

In various embodiments, the registration request is transmitted in an extensible authentication protocol initiate request or a re-authentication request.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a network entity in a cellular network, the method comprising:
   generating a re-authentication key; and
   transmitting the re-authentication key with a key set identifier (ID) in an extensible authentication protocol message, wherein the re-authentication key is generated using three or more of:
   a public land mobile network (PLMN) ID;
   a trusted gateway function ID;
   a subscription permanent identifier (SUPI); or
   a user equipment (UE) ID.

2. The method of claim 1, wherein transmitting the re-authentication key with the key set ID in the extensible authentication protocol message comprises transmitting the re-authentication key from an authentication server function to a security anchor functionality, the re-authentication key comprises a re-authentication root key, a domain-specific root key, or a serving network re-authentication key, and the re-authentication key is generated by a key derivation function of an authentication server function, or a home public land mobile network, or both.

3. The method of claim 1, wherein the re-authentication key is further generated using a separator that comprises "\0", a length of a parameter comprises a length of each S parameter of a set of S parameters, and the set of S parameters comprises one or more of: the PLMN ID; a serving network name ID; a trusted network domain name ID; a trusted gateway function ID; the SUPI; a network access identifier; the UE ID; and the separator.

4. The method of claim 1, wherein a re-authentication integrity key is generated using one or more of the trusted gateway function ID, the UE ID, a re-authentication integrity key label, an anti-bidding down between architecture parameter, and a separator.

5. The method of claim 1, wherein a trusted access point key or re-authentication master session key is generated using one or more of a trusted access point ID, trusted access point information, a trusted access point mobility counter, an anti-bidding down between architecture parameter, and a separator.

6. The method of claim 1, wherein the re-authentication key is generated by a key derivation function of an authentication server function, or a home public land mobile network, or both.

7. A network entity in a cellular network, the network entity comprising:
    at least one memory; and
    at least one processor coupled with the at least one memory and configured to cause the network entity to:
        generate a re-authentication key; and
        transmit the re-authentication key with a key set identifier (ID) in an extensible authentication protocol message, wherein the re-authentication key is generated using three or more of:
            a public land mobile network (PLMN) ID;
            a trusted gateway function ID;
            a subscription permanent identifier (SUPI); or
            a user equipment (UE) ID.

8. The network entity of claim 7, wherein the at least one processor is configured to cause the network entity to transmit the re-authentication key from an authentication server function to a security anchor functionality, the re-authentication key comprises one or more of a re-authentication root key, a domain-specific root key, or a serving network re-authentication key, and the re-authentication key is generated by a key derivation function of an authentication server function, and a home public land mobile network.

9. The network entity of claim 7, wherein the re-authentication key is further generated using a separator comprising comprises "\0", a length of a parameter comprises a length of each S parameter of a set of S parameters, and the set of S parameters comprises one or more of: the PLMN ID; a serving network name ID; a trusted network domain name ID; a trusted gateway function ID; the SUPI ID; a network access ID; the UE ID; and the separator.

10. The network entity of claim 7, wherein a re-authentication integrity key is generated using one or more of the trusted gateway function ID, the UE ID, a re-authentication integrity key label, an anti-bidding down between architecture parameter, and a separator.

11. The network entity of claim 7, wherein a trusted access point key or re-authentication master session key is generated using one or more of a trusted access point ID, trusted access point information, a trusted access point mobility counter, an anti-bidding down between architecture parameter, and a separator.

12. The network entity of claim 7, wherein the re-authentication key is generated by a key derivation function of an authentication server function, or a home public land mobile network, or both.

13. The network entity of claim 7, wherein the re-authentication key comprises a re-authentication root key, a domain-specific root key, or a serving network re-authentication key.

14. A processor for cellular network communication, the processor comprising:
    at least one controller coupled with at least one memory and configured to cause the processor to:
        generate one or more of a re-authentication root key, a serving network re-authentication key, a re-authentication integrity key, an access point key, and a re-authentication master session key using three or more of:
            a public land mobile network (PLMN) identifier (ID);
            a trusted gateway function ID;
            a subscription permanent identifier (SUPI);
            a user equipment (UE) ID;
            a re-authentication integrity key label;
            an anti-bidding down between architecture parameter;
            a trusted access point ID;
            trusted access point information; or
            a trusted access point mobility counter; and
        transmit one or more of the re-authentication root key, the serving network re-authentication key, the re-authentication integrity key, the access point key, or the re-authentication master session key to the UE.

15. The processor of claim 14, wherein the at least one controller is configured to cause the processor to generate the re-authentication root key after a successful primary authentication.

16. The processor of claim 14, wherein the at least one controller is configured to cause the processor to generate the re-authentication integrity key during re-authentication and to generate the access point key, or the re-authentication master session key, or both during re-authentication or in response to a re-authentication request.

17. The processor of claim 14, wherein the re-authentication master session key is further generated using a separator that comprises "\0", a length of a parameter comprises a length of each S parameter of a set of S parameters, and the set of S parameters comprises one or more of: the PLMN ID; a serving network name ID; a trusted network domain name ID; a trusted gateway function ID; the subscription permanent ID; a network access ID; the UE ID; the separator; the re-authentication integrity key label; the anti-bidding down between architecture parameter; the trusted access point ID; the trusted access point information; and the trusted access point mobility counter.

18. The processor of claim 14, wherein the at least one controller is configured to cause the processor to receive a re-authentication key set ID, trusted access point identification information, and trusted gateway function identification information in an extensible authentication protocol success message;
    receive an extensible authentication protocol initiate re-authentication start message along with a target trusted access point ID; and transmit a registration request to a target trusted access point with the re-authentication key set ID, wherein the registration request is transmitted in an extensible authentication protocol initiate request or a re-authentication request.

19. The processor of claim 14, wherein one or more of the re-authentication root key, the serving network re-authentication key, the re-authentication integrity key, the access point key, and the re-authentication master session key is generated by a key derivation function of an authentication server function, or a home public land mobile network, or both.

20. The processor of claim 14, wherein one or more of the re-authentication root key, the serving network re-authentication key, the re-authentication integrity key, the access point key, and the re-authentication master session key comprises a domain-specific root key.

\*    \*    \*    \*    \*